F. H. STILLMAN.
TESTING APPARATUS.
APPLICATION FILED MAY 10, 1907.
908,623.
Patented Jan. 5, 1909.
2 SHEETS—SHEET 1.
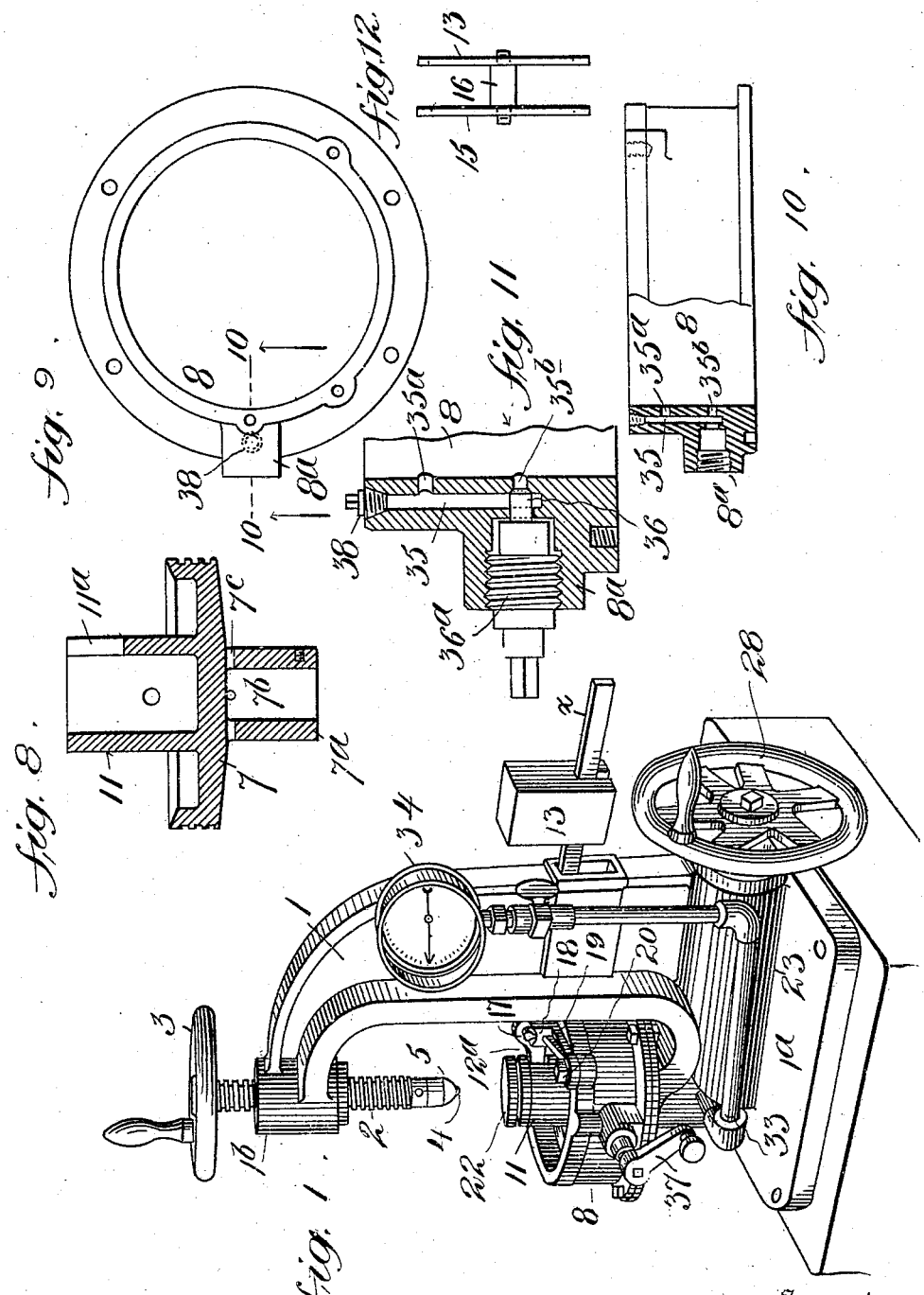
Witnesses:
Inventor
F. H. Stillman.
By his Attorney
T. F. Bourne

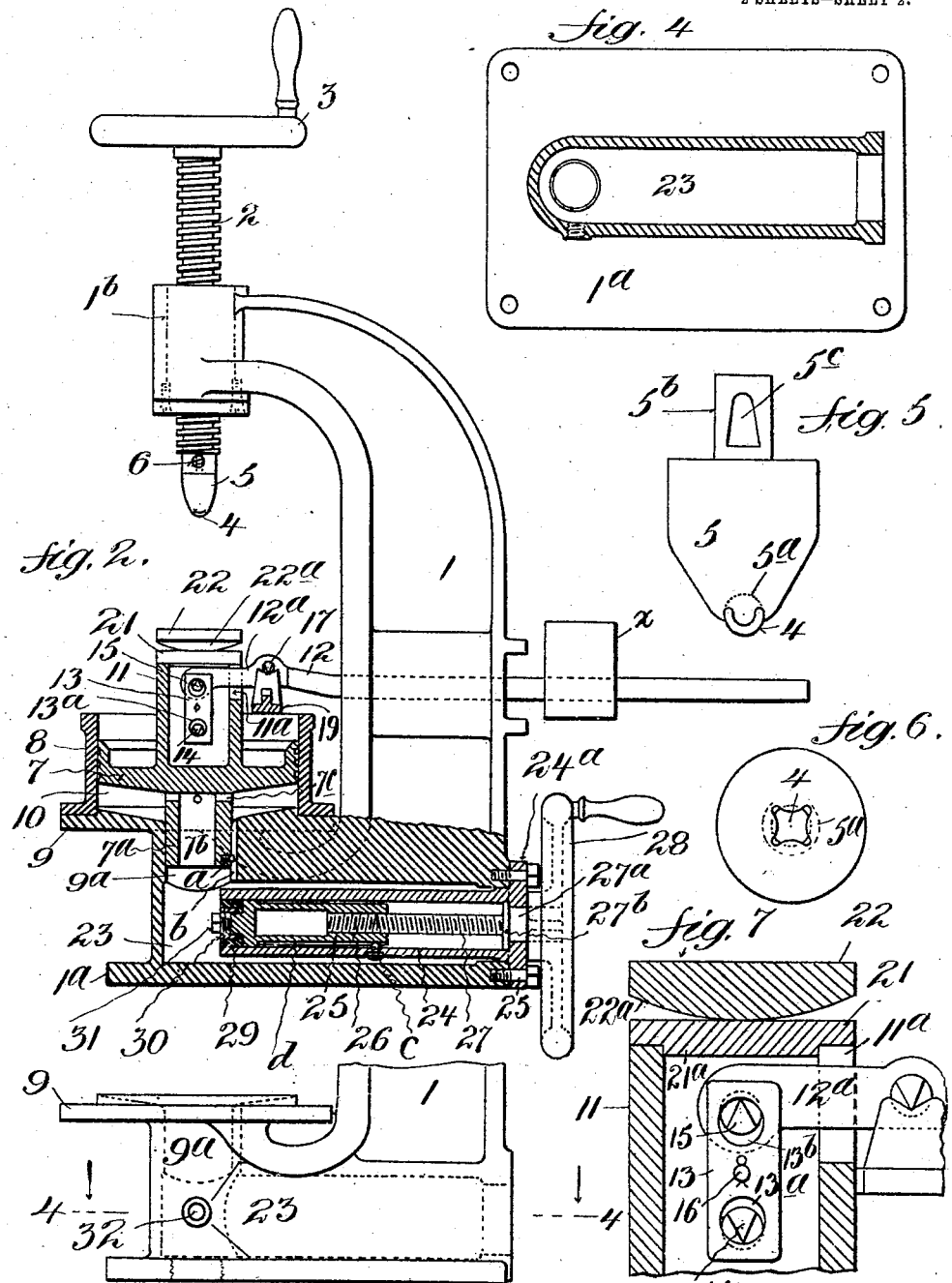

UNITED STATES PATENT OFFICE.

FRANCIS H. STILLMAN, OF NEW YORK, N. Y., ASSIGNOR TO THE WATSON-STILLMAN COMPANY, A CORPORATION OF NEW JERSEY.

TESTING APPARATUS.

No. 908,623.   Specification of Letters Patent.   Patented Jan. 5, 1909.

Application filed May 10, 1907. Serial No. 372,871.

*To all whom it may concern:*

Be it known that I, FRANCIS H. STILLMAN, a citizen of the United States, residing in New York city, borough of Brooklyn, New York, have invented certain new and useful Improvements in Testing Apparatus, of which the following is a specification.

The object of my invention is to provide improved means for testing the hardness, strength etc. of steel, iron and other materials by causing an impression to be made in such material by a hardened ball, or the like, whereby from the pressure exerted and the dimensions of the impression made in the material the degree of hardness etc. thereof may be calculated from a suitable table adapted for the purpose.

My invention comprises a suitable frame provided with a support for the article to be tested, means for balancing such support with its super-imposed article, means for opposing the hardened ball or the like against said article, means for pressing said article against said ball, and means for indicating the pressure exerted against said article.

The invention also comprises the novel details of improvement and combinations of parts which will be more fully hereinafter set forth and then pointed out in the claims.

Reference is to be had to the accompanying drawings forming part hereof, wherein, Figure 1 is a perspective view of a testing apparatus embodying my invention; Fig. 2 is a side elevation thereof, partly in section; Fig. 3 is a detail side view of the lower portion of the apparatus; Fig. 4 is a section on the line 4, 4 in Fig. 3, looking in the direction of the arrows; Fig. 5 is an enlarged detail view of the ball carrier; Fig. 6 is an end view thereof; Fig. 7 is an enlarged detail sectional view of part of the support for the article to be tested; Fig. 8 is a central sectional view of said support; Fig. 9 is a plan view of the cylinder or chamber for said support; Fig. 10 is a side view thereof, partly in section on the line 10, 10 in Fig. 9; Fig. 11 is an enlarged detail section on said line, showing the valve for controlling the charging of said chamber or cylinder with liquid, and Fig. 12 is a detail view of the links.

Similar numerals of reference indicate corresponding parts in the several views.

In the drawings, the numeral 1 indicates a suitable frame shown provided with a base $1^a$ which may be mounted upon any support desired, and said frame is shown provided with a hub $1^b$ carrying a screw 2 meshing in suitable threads in said hub and provided with a crank handle or wheel 3. At its lower end the screw 2 carries a ball or suitable impressing member 4, which may be made of hardened steel, which ball is shown set in a recess $5^a$, of shape similar to the ball, located in the lower end of a head 5 carried by said screw 2. Said head is shown provided with a stem $5^b$ to enter a corresponding socket in the lower end of screw 2 and adapted to be detachably held therein, as by a screw 6 which may enter a suitable recess $5^c$ in stem $5^b$, see Figs. 2 and 5.

Beneath screw 2 and its ball 4 is located a support 7, shown in the form of a piston or plunger fitted to slide in a chamber or cylinder 8 mounted securely upon base 9 of frame 1. The base 9 has a bore $9^a$ receiving the recessed or hollow guide or stem $7^a$ of support or plunger 7 that depends below the latter, the bore $7^b$ of guide $7^a$ being shown provided with ports $7^c$ that communicate with the space 10, beneath support or plunger 7 within chamber or cylinder 8 and above base 9, which constitutes a liquid pressure-chamber for raising support or plunger 7 by hydraulic pressure. A screw $a$ carried by guide or stem $7^a$ and entering a groove $b$ in the base keeps plunger 7 from rotating. The support 7 is shown provided with an upward extension 11 to which is pivotally connected a balance beam or arm 12, shown provided with an adjustable weight $x$. The short arm $12^a$ of beam 12 is shown passing through a slot $11^a$ in upright 11 and pivotally connected with said upright by links 13 (Fig. 2), connected with support 11 by knife-edge pivot 14 passing through support 11 and through apertures $13^a$ in links 13, and said links are connected with arm $12^a$ by knife-edge pivot 15 carried by arm $12^a$ and passing through openings $13^b$ in links 13, whereby to reduce friction at the pivotal points of said parts. Two links 13 are shown side by side, connected together by a shoulder-pin 16, between which links the arm $12^a$ extends for balancing said parts (see Fig. 12). The beam or arm 12 is also shown provided with knife-edge pivot 17 supported upon suitable bearings 18, carried by a cross bar 19 shown secured upon the edge of chamber 8, as by screws 20. Upon the top of support 11 is a cap or plate 21, shown provided with a downward extension 21ª fitting within the bore of support 11 to keep said block centered. While the article to be tested may rest directly upon plate 21, I preferably place on said plate a block 22 having a curved or rounded under surface 22ª bearing upon cap or plate 21, whereby block 22 may rock to allow for variations in shape of articles to be placed thereon for testing, and to permit such articles to properly aline beneath and in contact with ball 4.

At 23 is a pressure chamber shown formed within the base portion of frame 1, extending horizontally, and communicating at one end with the bore 9ª, and within said chamber is located a liner or cylinder 24 shown provided with a flange 24ª fastened to frame 1, as by screws 25. The liner or cylinder 24 is properly bored to receive a plunger or piston 25 that is shown provided with internal threads 26 receiving a screw 27, journaled at its bearing portion 27ª in head 24ª, and having a flange 27ᵇ within said head and a hand-wheel or crank 28 without said head, whereby said screws may rotate without advancing to cause plunger 25 to travel back and forth in liner or cylinder 24. A screw c carried by cylinder 24 and entering a groove d in piston 25 keeps the piston from rotating. The plunger 25 at its inner end may have suitable packing 29 held in place in any suitable manner, as by sleeve 30 and set screw 31. Chamber 23 has an outlet 32 connected by a pipe 33 with a pressure indicator or gage 34.

The means I have shown for charging fluid into space 10 and chamber 23 comprise a vertically disposed channel 35 in the wall of chamber 8 and provided with ports 35ª, 35ᵇ leading into said chamber, and at 36 is a valve or stem adapted to close port 35ª and shown provided with screw threads 36ª meshing in threads in hub 8ª and having a crank handle 37. A plug 38 closes channel 35 at its top. By pouring oil or other suitable fluid into chamber 8 on top of plunger 7 and opening the valve 36 said fluid will flow through port 35ª into channel 35 and thence through port 35ᵇ into space 10 and chamber 23 and into liner or cylinder 24 when plunger or piston 25 is drawn back.

In using my improvements the plunger or piston 25 is withdrawn into its cylinder 24, the article to be tested is placed upon block 22 or plate 21 and balanced by means of arm 12 and weight x, and chambers 10 and 23, bore 7ᵇ and cylinder 24 are charged full of suitable liquid, such as oil, by opening valve 36 and allowing the liquid to flow through passage 35 and port 35ᵇ until the liquid fully engages the under surface of plunger 7, and then valve 36 is closed. Screw 2 is rotated to bring ball 4 into contact with the article to be tested and then screw 27 is rotated to cause plunger 25 to force the liquid against plunger 7 to push the article to be tested forcibly against ball 4 the amount of pressure thus produced by the article against ball 4 thereby being indicated on gage 34 by reason of flow of fluid from chamber 23 through pipe 33 to said gage. The pressure of the article being tested against ball 4 will cause the ball to make an impression in such article, and then by dividing the amount of said pressure by the area of the impression made in the article the quotient found may be compared with a suitable table or standard adopted with respect to the size of the ball being used, which will indicate the degree of hardness, strength, or other data required respecting such article.

My invention is not limited to the details of construction and arrangements of parts shown and described as they may be varied within the scope of the appended claims without departing from the spirit thereof.

Having now described my invention what I claim is:

1. A testing apparatus comprising an arm provided with a screw, a hardened impressing member carried by said screw, a plunger opposed to said member, means for forcing said plunger toward said member, and means for indicating the pressure employed in operating said plunger.

2. A testing apparatus comprising a frame provided with a vertically disposed screw, a hardened impressing member carried by and beneath said screw, an upwardly disposed plunger beneath said member, means for forcing said plunger upwardly toward said member, and means for indicating the pressure employed in operating said plunger.

3. A testing apparatus comprising a frame provided with a vertically disposed screw, a head detachably carried at the lower end of said screw, a hardened ball carried at the lower end of said head, a plunger guided to move vertically beneath said ball, means for forcing said plunger upwardly toward said ball, and means for indicating the pressure employed in operating said plunger.

4. A testing apparatus comprising a frame, an impressing member adjustably carried thereby, a chamber opposed to said member, a plunger having a guide depending into a bore in the base of the frame beneath said chamber, said guide having a bore provided with ports communicating with said chamber, a cylinder and piston communicating with said bore, means for operating said piston, and means for indicating the pressure employed in operating said plunger.

5. A testing apparatus comprising a frame, an impressing member carried thereby, a chamber opposed to said member and provided with a passage having a port, a valve to control said port, a plunger within said chamber, said port communicating with said chamber beneath said plunger, a cylinder and piston communicating with said chamber, means for operating said piston, and an indicator in communication with said chamber for indicating the pressure employed in operating said plunger.

6. A testing apparatus comprising a frame provided with an impressing member, a chamber opposed to said member and provided with a passage having ports, a valve to control one of said ports, a plunger within said chamber and normally disposed between said ports, whereby fluid placed upon said plunger may flow through said ports and pass to the chamber beneath the plunger, a cylinder and piston communicating with said chamber, means to operate said piston, and an indicator in communication with said chamber for indicating the pressure employed in operating said plunger.

FRANCIS H. STILLMAN.

Witnesses:
   Geo. D. Gillan,
   Jas. W. Hargan.